US009918330B2

(12) United States Patent
Chow et al.

(10) Patent No.: US 9,918,330 B2
(45) Date of Patent: Mar. 13, 2018

(54) SOFT-TDMA FOR WIRELESS AD-HOC NETWORKS

(71) Applicant: Taiwan Semiconductor Manufacturing Co., Ltd., Hsinchu (TW)

(72) Inventors: Jerry Chow, Oceanside, CA (US); David Gell, San Diego, CA (US); Erik Colban, San Diego, CA (US)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 107 days.

(21) Appl. No.: 14/975,382

(22) Filed: Dec. 18, 2015

(65) Prior Publication Data

US 2016/0183280 A1   Jun. 23, 2016

Related U.S. Application Data

(60) Provisional application No. 62/093,841, filed on Dec. 18, 2014.

(51) Int. Cl.
*H04W 72/12*  (2009.01)
*H04W 72/04*  (2009.01)
*H04W 84/18*  (2009.01)

(52) U.S. Cl.
CPC ........ *H04W 72/12* (2013.01); *H04W 72/0446* (2013.01); *H04W 84/18* (2013.01)

(58) Field of Classification Search
CPC ......... H04W 72/0446; H04W 72/1205; H04W 72/1226–72/1236;
(Continued)

(56) References Cited

U.S. PATENT DOCUMENTS

2007/0133556 A1\* 6/2007 Ding ............... H04L 41/147
370/395.4
2016/0029403 A1\* 1/2016 Roy ................ H04W 72/0406
370/336

OTHER PUBLICATIONS

Etsi. "Intelligent Transport Systems (ITS); STDMA recommended parameters and settings for cooperative ITS; Access Layer Part." ETSI TR 102 861. V1.1.1. Jan. 2012.
(Continued)

*Primary Examiner* — Pao Sinkantarakorn
(74) *Attorney, Agent, or Firm* — JCIPRNET

(57) ABSTRACT

A method, network device and computer program product schedule packets received from a higher layer packet source for transmission from a network device onto a medium shared with at least one contending network device where access to the medium is controlled by a medium access protocol. Medium history information associated with the medium is obtained. A transmission schedule that provides for periodic opportunities to transmit a packet from the network device is determined in the network device. The transmission schedule minimizes contention with transmission from the at least one contending network device by taking into account the medium history information associated with the medium. At least some of the packets are provided to a medium access controller in the network device that operates in accordance with the medium access protocol, based on the determined transmission schedule. Packets output from the medium access controller are transmitted from the network device.

21 Claims, 9 Drawing Sheets

(58) Field of Classification Search
CPC ......... H04W 72/1263–72/1273; H04W 74/04; H04W 74/06; H04W 74/08–74/0825; H04W 74/0866–74/0891; H04L 29/08027
See application file for complete search history.

(56) References Cited

OTHER PUBLICATIONS

IEEE, "IEEE Standard for Information technology—Telecommunications and information exchange between systems; Local and metropolitan area networks—Specific requirements; Part 11: Wireless LAN Medium Access Control (MAC) and Physical layer (PHY) Specifications", IEEE Std 802.11™-2012 (Revision of IEEE Std 802.11-2007), Mar. 29, 2012.

IEEE, "IEEE Standard for Local and metropolitan area networks—Part 15.4: Low-Rate Wireless Personal Area Networks (LR-WPANs)", IEEE Std 802.15A™-2011 (Revision of IEEE Std 802.15.4-2006), Sep. 5, 2011.

IEEE, "IEEE Standard for Wireless Access in Vehicular Environments (WAVE)—Networking Services", IEEE Std 1609.3™-2010 (Revision of IEEE Std 1609.3-2007), Dec. 30, 2010.

IEEE, "IEEE Standard for Wireless Access in Vehicular Environments (WAVE)—Identifier Allocations", IEEE Std 1609.12™-2012, Sep. 21, 2012.

Kenney et al. "Controlling Channel Congestion using CAM Message Generation Rate." ETSI ITS Workshop. Feb. 6, 2013.

Pei et al. "Validation of OFDM error rate model in ns-3." The Boeing Company. 2010.

\* cited by examiner

SOFT-TDMA FOR WIRELESS AD-HOC NETWORKS

BACKGROUND

Field of the Invention

The present invention relates to wireless ad-hoc networks and more particularly to a system and method of providing soft time-division multiple access (Soft TDMA) for wireless ad-hoc networks.

Description of the Related Art

Attempts to address the performance degradation that occurs in wireless ad-hoc networks with contention-based Media Access Control (MAC) methods at higher traffic loads have typically taken two approaches. A first approach attempts to limit the incident traffic load from increasing to a level at or beyond which the degradation in performance becomes unacceptable. This approach is generally categorized as congestion control since the main emphasis is on preventing channel congestion by controlling the incident traffic load. However, since there is no change to the contention resolution behavior of the MAC, this approach does not improve the achievable network throughput.

A second approach attempts to modify the MAC behavior to more effectively use the available channel capacity based on the characteristics of the incident traffic. For example, if the application scenario requires each wireless node to regularly send traffic over the wireless medium and the data packets comprising the traffic are predominantly of one size or within a small range of sizes, a time-division multiple access (TDMA) scheme could be more efficient. With a TDMA-type scheme, a wireless node may perform regular transmissions without the need to contend for access for each transmission. However, replacing the contention-based MAC with a TDMA-based MAC can introduce other inadequacies, such as complexities and possible inefficiencies to support a mix of traffic with different characteristics and interoperability with existing wireless nodes if there is already a deployed population of wireless nodes with the contention-based MAC.

A solution is needed that can improve the achievable network throughput while being able to support a mix of different traffic types.

BRIEF SUMMARY OF THE INVENTION

Embodiments of the present disclosure address deficiencies of the art in respect to packet scheduling and provide a novel and non-obvious method, system and computer program product for scheduling packets received from a higher layer packet source for transmission from a network device onto a medium shared with at least one contending network device where access to the medium is controlled by a medium access protocol. In an embodiment of the disclosure, medium history information associated with the medium is obtained. A transmission schedule that provides for periodic opportunities to transmit a packet from the network device is determined in the network device. The transmission schedule minimizes contention with transmission from the at least one contending network device by taking into account the medium history information associated with the medium. At least some of the packets are provided to a medium access controller in the network device that operates in accordance with the medium access protocol, based on the determined transmission schedule. Packets output from the medium access controller are transmitted from the network device.

In accordance with another aspect of the disclosure, a network device is configured to schedule packets received from a higher layer packet source for transmission by the network device onto a medium shared with at least one contending network device where access to the medium is controlled by a medium access protocol. The network device comprises a memory, a transmitter coupled to the memory, and a processor coupled to the memory and to the transmitter. The processor is configured to obtain medium history information associated with the medium; determine a transmission schedule that provides for periodic opportunities to transmit a packet from the network device, the transmission schedule minimizing contention with transmission from the at least one contending network device by taking into account the medium history information associated with the medium; provide, to a medium access controller that operates in accordance with the medium access protocol, at least some of the packets based on the determined transmission schedule; and transmit, from the transmitter, packets output from the medium access controller.

In accordance with yet another aspect of the present disclosure, a computer program product is provided for scheduling packets received from a higher layer packet source for transmission by the network device onto a medium shared with at least one contending network device where access to the medium is controlled by a medium access protocol. The computer program product comprises a storage medium readable by a processing circuit and storing instructions for execution by the processing circuit for performing a method. The method comprises obtaining medium history information associated with the medium; determining, in the network device, a transmission schedule that provides for periodic opportunities to transmit a packet from the network device, wherein the transmission schedule minimizes contention with transmission from the at least one contending network device by taking into account the medium history information associated with the medium; providing, to a medium access controller in the network device that operates in accordance with the medium access protocol, at least some of the packets based on the determined transmission schedule; and transmitting, from the network device, packets output from the medium access controller.

Additional aspects of the disclosure will be set forth in part in the description which follows, and in part will be obvious from the description, or may be learned by practice of the disclosure. The aspects of the disclosure will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the disclosure and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The descriptions and features disclosed herein, and in the accompanying documents, can be applied to various communication systems, including wireline and wireless technologies. Such communication systems may be capacity-limited. For example, the features disclosed herein can be used with ad-hoc networks such as, for example, vehicular networks including Wireless Access for Vehicular Environments (WAVE) based on Dedicated Short-Range Communications (DSRC), infrastructure-based networks such as, for example, Cellular 2G, 3G, 4G (including Long Term Evolution (LTE), LTE Advanced, and WiMAX), cellular backhaul, Wi-Fi, Ultra Mobile Broadband (UMB), cable modem, and other point-to-point or point-to-multipoint wireline or wireless technologies. For concise exposition, various aspects are described using terminology and organization of particular technologies and standards. However, the features described herein are broadly applicable to other technologies and standards.

Embodiments of the disclosure provide the benefits of TDMA for periodic-type transmissions and can be largely realized while providing backwards compatibility with wireless nodes operating solely with a contention-based MAC. In contrast to conventional TDMA schemes, the methods described herein do not require a common format and alignment of time slots and frames between nodes in the network. Since there is no hard requirement for common format or synchronization, this method will be referred to herein as "Soft-TDMA."

Figure 1:
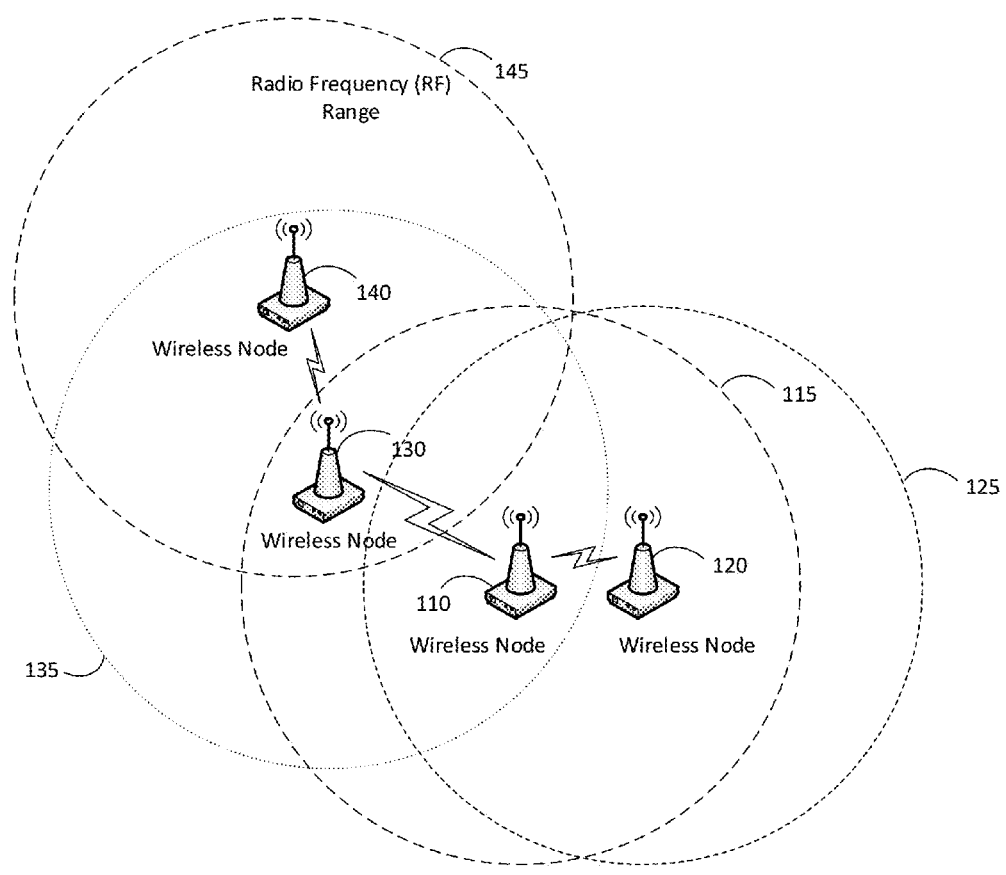
FIG. 1 is a pictorial illustration of a wireless ad-hoc network in accordance with an aspect of the present disclosure.

In a wireless ad-hoc network, wireless nodes communicate with other wireless nodes without centralized control of medium access. Such a network is illustrated in FIG. 1. In FIG. 1, a wireless node 110 has a radio frequency (RF) range 115 such that all nodes within RF range 115 can communicate directly with wireless node 110. Similarly, wireless node 120 has an RF range 125, wireless node 130 has an RF range 135 and wireless node 140 has an RF range 145. By direct communications, it is meant that a wireless node can successfully receive data sent by another wireless node over the wireless medium without being relayed by an intermediate wireless node or device. The data being transferred typically are comprised of one or more data packets in support of applications running at the wireless nodes. Therefore, in the example network of FIG. 1, wireless node 110 can communicate directly with wireless nodes 120 and 130 but not with wireless node 140. Similarly, wireless node 140 with RF range 145 can communicate directly with wireless node 130 but not with wireless nodes 110 and 120.

A local wireless network can be defined as the set of wireless nodes that can communicate directly over the wireless medium. In a wireless ad-hoc network, the local wireless network may be different for each transmitting wireless node. Furthermore, if the wireless nodes are mobile, the local wireless network of a transmitting wireless node can change over time.

Wireless nodes 110, 120, 130 and 140 in FIG. 1 are representative of various wireless devices that may participate in a wireless ad-hoc network. Examples of such devices may include, but are not restricted to, smartphones, tablets, vehicles, various portable or wearable specialized application devices (such as personal activity monitoring devices, sensors, and remote telemetry or control devices where such devices are equipped with inter-operable wireless interfaces). Wireless interfaces are generally inter-operable if they utilize a common wireless communication technology and protocol. Examples of such wireless communications technologies and protocols include Dedicated Short-Range Communications (DSRC), which is an ad-hoc network operating mode of the IEEE 802.11 wireless local area network standard, and the IEEE 802.15.4 wireless personal area network standard.

An important aspect of the wireless link design that influences achievable performance in an ad-hoc network is how access to the wireless medium is controlled between nodes. Since there is no centralized control of medium access, this control is distributed amongst the nodes that communicate via the medium as governed by a common medium access control (MAC) protocol. A common trait of MAC protocols for ad-hoc networks is a mechanism to resolve contention between nodes that need to access the medium at about the same time. A well-known example of a MAC mechanism of this type is Carrier-Sense Multiple Access with Collision Avoidance (CSMA/CA). CSMA/CA is employed by the IEEE 802.11 standard operating in Distributed Coordination Function (DCF) mode.

An example of a wireless ad-hoc network is a vehicular ad-hoc network (VANET) operating on a Dedicated Short-Range Communications (DSRC) safety channel. In a VANET, the wireless nodes include vehicles equipped with DSRC radios. When operating on the safety channels, each vehicle periodically broadcasts information about itself that other vehicles in the vicinity can use to determine the potential or occurrence of unsafe conditions on the road. DSRC uses an ad-hoc operating mode of the IEEE 802.11 standard MAC. This mode is typically referred to as IEEE 802.11p and is based on CSMA/CA.

While protocols such as CSMA/CA are effective at providing fair on-demand access for multiple nodes contending for the medium at low to moderate loading of the channel, the effectiveness of the collision avoidance scheme degrades at high loading of the channel, resulting in a significant increase in packet reception failures or packet transfer delays. When the primary traffic being transmitted is periodic in nature, comprising packets of fairly constant size, time-division multiplexing between the periodic streams of packets can achieve better utilization of the channel with a tighter bound on packet delays.

Soft-TDMA operation may be described in the context of a unidirectional outgoing logical link, supporting the transmission of a sequence of packets generated by a higher layer protocol or application. This set of packets or logical link is denoted as an S-stream. For example, in DSRC, an upper layer protocol may create a periodic sequence of basic safety messages and send these messages, in the form of packets, as an S-stream to the Soft-TDMA layer.

For each S-stream, Soft-TDMA establishes a periodic schedule of packet release times with a time alignment that attempts to minimize contention with other transmissions on the wireless medium. Packets arriving from higher protocol layers for an S-stream may be delayed by Soft-TDMA to align with packet release times scheduled for the S-stream. At a packet release time for an S-stream, a packet of the S-stream being delayed by Soft-TDMA may be released to the underlying medium access control (MAC) and physical layers for transmission onto the wireless medium. A packet for an S-stream may not be sent at a packet release time if no packets for the S-stream are being delayed by Soft-TDMA at that time.

An S-stream may serve one or more higher layer protocol traffic sources having a common requirement for delay and having a common reference packet size. The reference packet size may be a typical or average size of packets from a higher layer protocol traffic source. Alternatively, the reference packet size may be used as a threshold. Packets smaller than the reference packet size may be subjected to a maximum delay requirement. For example, an S-stream may be associated with traffic that is periodically broadcasted, such as the broadcasting of Basic Safety Messages (BSM) in vehicular ad-hoc networks. In this example, the delay requirement may be set to the periodic transmission interval of these Basic Safety Messages and the reference packet size may be set to the predominant size of the transport layer packets containing these messages.

Packets from higher protocol layers arriving at Soft-TDMA for an S-stream may be periodic, aperiodic or a mixture of periodic and aperiodic traffic. More than one S-stream may be simultaneously active within a wireless node.

Based on the delay requirement and reference packet size information for an S-stream, Soft-TDMA determines a repetition period $T_P$ between packet release times and a transmission duration allowance ($T_{tx}$) at each packet release time to be used for packets of an S-stream. $T_{tx}$ is a minimum time duration which is free of interference from other nodes in order to prevent contention between transmissions of packets from an S-stream and those from other wireless nodes. Values for $T_P$ and $T_{tx}$ may be the same or different between Soft-TDMA streams.

A common set of $T_P$ values may be used by all nodes in a network. For example, $T_P$ values may be taken from a subset of a geometric sequence derived using a base $T_P$ value, $T_{P0}$, and an integer common ratio, r, such that the $n^{th}$ value in the sequence is given by $T_{P0}*r^n$ for $n \geq 0$. For example, $T_P$ values may be the first four terms of the geometric sequence for r=2: $T_{P0}$, $2*T_{P0}$, $4*T_{P0}$ and $8*T_{P0}$. The subset of values taken from the sequence need not be contiguous.

Soft-TDMA Operation

Figure 2:
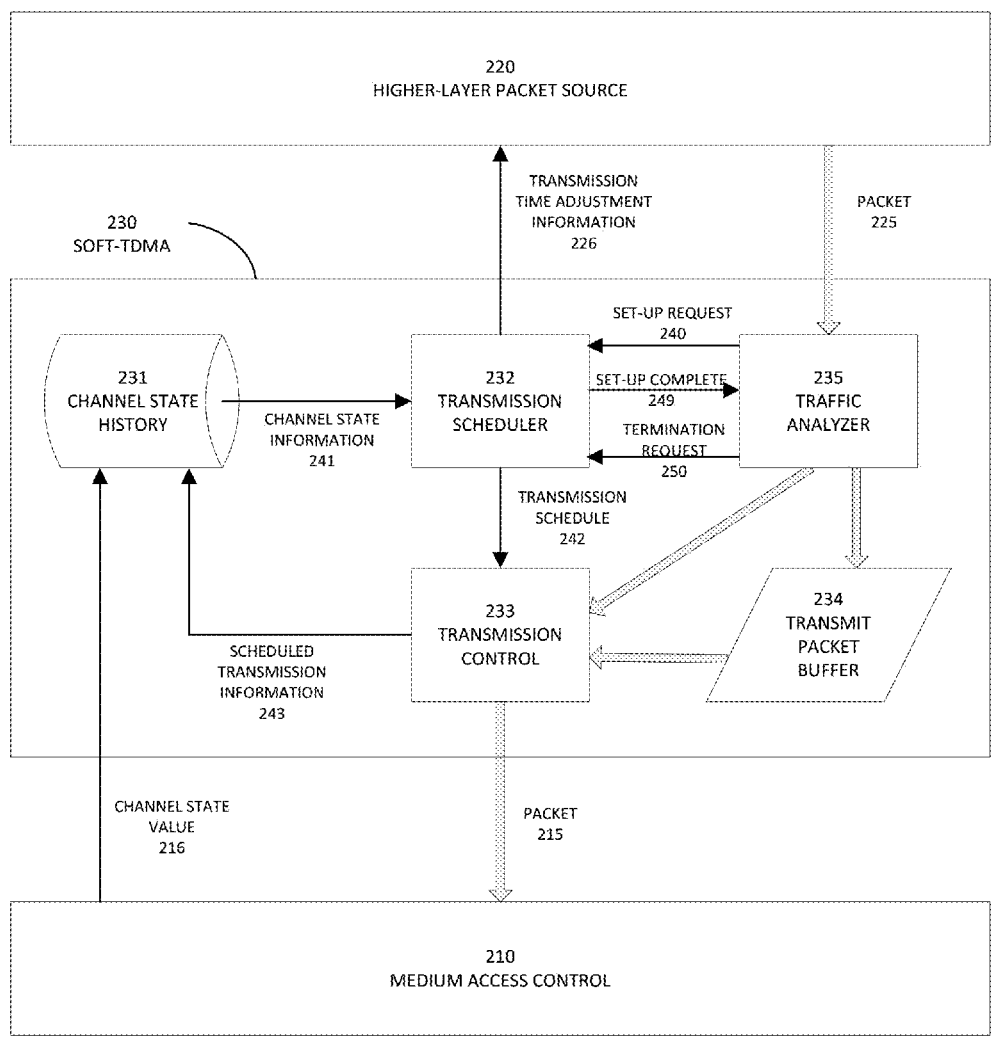
FIG. 2 is a schematic illustration showing the functions of Soft-TDMA within a wireless node in accordance with an aspect of the present disclosure.

FIG. 2 shows the functions of Soft-TDMA 230 within a wireless node. A Higher Layer Packet Source (HLPS) 220 generates a packet 225 that is to be transmitted onto the wireless medium via Medium Access Control (MAC) 210. Without Soft-TDMA, packet 225 would be passed directly by HLPS 220 to MAC 210. With Soft-TDMA, packet 225 may be intercepted and delayed before being sent as packet 215 to MAC 210 for transmission onto the wireless medium. Any delay intentionally applied by Soft-TDMA attempts to minimize the possibility of contention and collision with periodic transmissions from other wireless nodes.

Operation of Soft-TDMA may be divided into two processes: a Transmission Schedule Determination Process and a Packet Transmission Process. The functions depicted in FIG. 2 are described in the context of these two processes.

The Packet Transmission Process manages the data path processing and involves Traffic Analyzer 235, Transmit Packet Buffer 234 and Transmission Control (TC) 233 and includes interactions with Higher-Layer Packet Source (HLPS) 220 and Medium Access Control (MAC) 210 external to the Soft-TDMA system. The data path is represented by the wide, gray arrows between functions in FIG. 2. Packets 225 arriving from HLPS 220 are processed by Traffic Analyzer 235. If the packet belongs to an S-stream, the packet is stored in Transmit Packet Buffer 234. At a time determined by TC 233, a packet is retrieved from the Transmit Packet Buffer 234 and forwarded as packet 215 to MAC 210 for transmission onto the wireless medium. If the packet received from HLPS 220 does not belong to an S-stream, Traffic Analyzer 235 may transfer the packet to TC 233 for immediate transmission. The Packet Transmission Process is described in further detail below in the section entitled "Packet Transmission Process."

The Transmission Schedule Determination Process manages the control processing and involves Channel State History (CSH) 231, Transmission Scheduler (TSC) 232 and TC 233 within the Soft-TDMA system and HLPS 220 and MAC 210 external to the system. The control-related interactions are shown as thin arrowed lines between functions in FIG. 2.

Channel State History (CSH) 231 stores an accumulation of Channel State Values 216 that may be reported by MAC 210. Channel State Value (CSV) 216 provides information on the presence of transmissions on the wireless medium. For example, CSV 216 may be a received signal strength (RSS) measurement, a busy or idle state of the channel, or an indication of the start or end of a wireless node's own transmission, each with an associated timestamp. The timestamp may be generated in MAC 210 and carried in CSV 216 or may be generated in CSH 231 and associated with CSV 216 upon arrival.

CSH 231 may also store Scheduled Transmission Information (STI) 243 from Transmission Control (TC) 233. STI 243 includes the packet release time for a packet of an S-stream and an associated transmission duration allowance ($T_{tx}$). TC 233 determines STI 243 as described further below.

Transmission Scheduler (TSC) 232 determines the best alignment in time to attempt periodic transmission onto the medium in order to minimize the possibility of contention and collision with periodic transmissions from other wireless nodes.

TSC 232 may use Channel State Information (CSI) 241 retrieved from CSH 231. In an embodiment, CSI 241 may be comprised of one or more CSV 216 and include an associated time for each CSV 216. CSI 241 may also include one or more STI 243 and include an associated time for each STI 243.

In an embodiment, the time values in CSI 241 are offsets from a reference time. The reference time may be established independently by each wireless node. For example, the reference time may be the time at which CSH 231 is initialized. In an alternative embodiment, the time value is a clock time value, such as the current system time as maintained by an operating system, such as LINUX™. Each wireless node may determine the method of expressing time values independently of other wireless nodes.

TSC 232 uses CSI 241 to construct a time-based history of the occurrence of transmissions on the wireless medium. This history may include the detected transmissions from other wireless nodes, the wireless node's own transmissions or both.

TSC 232 determines a Transmission Schedule (TS) 242 used to schedule the release of packets of an S-stream to MAC 210, as discussed in greater detail below in the section entitled "Transmission Schedule Determination Process."

TC 233 uses information received in TS 242 to control when a packet 225 stored in Transmit Packet Buffer 234 should be transferred to MAC 210 for transmission onto the medium. Therefore, TS 242 contains information sufficient to allow TC 233 to provide periodic packet release times for an S-stream. In an embodiment, TS 242 includes a Transmission Time Alignment (TTA) for the next packet release time and the value of $T_P$ for an S-stream. In a further embodiment, the TTA may be specified as a time offset value referenced from the current time. On receiving a TS 242 for an S-stream, TC 233 determines the next packet release time for a packet in the S-stream according to the TTA in TS 242. Thereafter, TC 233 determines subsequent packet release times for packets of the S-stream at intervals of duration $T_P$.

For each occurrence of a packet release time, TC 233 may compose STI 243 using the packet release time and $T_{tx}$ of the S-stream, and store STI 243 in CSH 231. TC 233 may obtain $T_{tx}$ for an S-stream from TSC 232. For example, $T_{tx}$ for an S-stream may be included in TS 242. As one skilled in the art would appreciate, there may be other methods of conveying $T_{tx}$ information, such as TSC 232 notifying TC 233 whenever a new value of $T_{tx}$ is applicable for an S-stream.

TSC 232 may provide Transmission Time Adjustment Information 226 to HLPS 220. Transmission Time Adjustment Information 226 includes the time at which a next packet 225 needs to be delivered by HLPS 220 in order to minimize the transfer delay over the wireless medium. Transmission Time Adjustment Information 226 may also include the value of $T_P$ for the S-stream. HLPS 220 may use Transmission Time Adjustment Information 226 to adjust when it generates and/or transfers Packet 225 to Soft-TDMA in order to minimize the end-to-end delay between packet generation at HLPS 220 and the corresponding reception at one or more wireless nodes.

Transmission Schedule Determination Process

Figure 3:
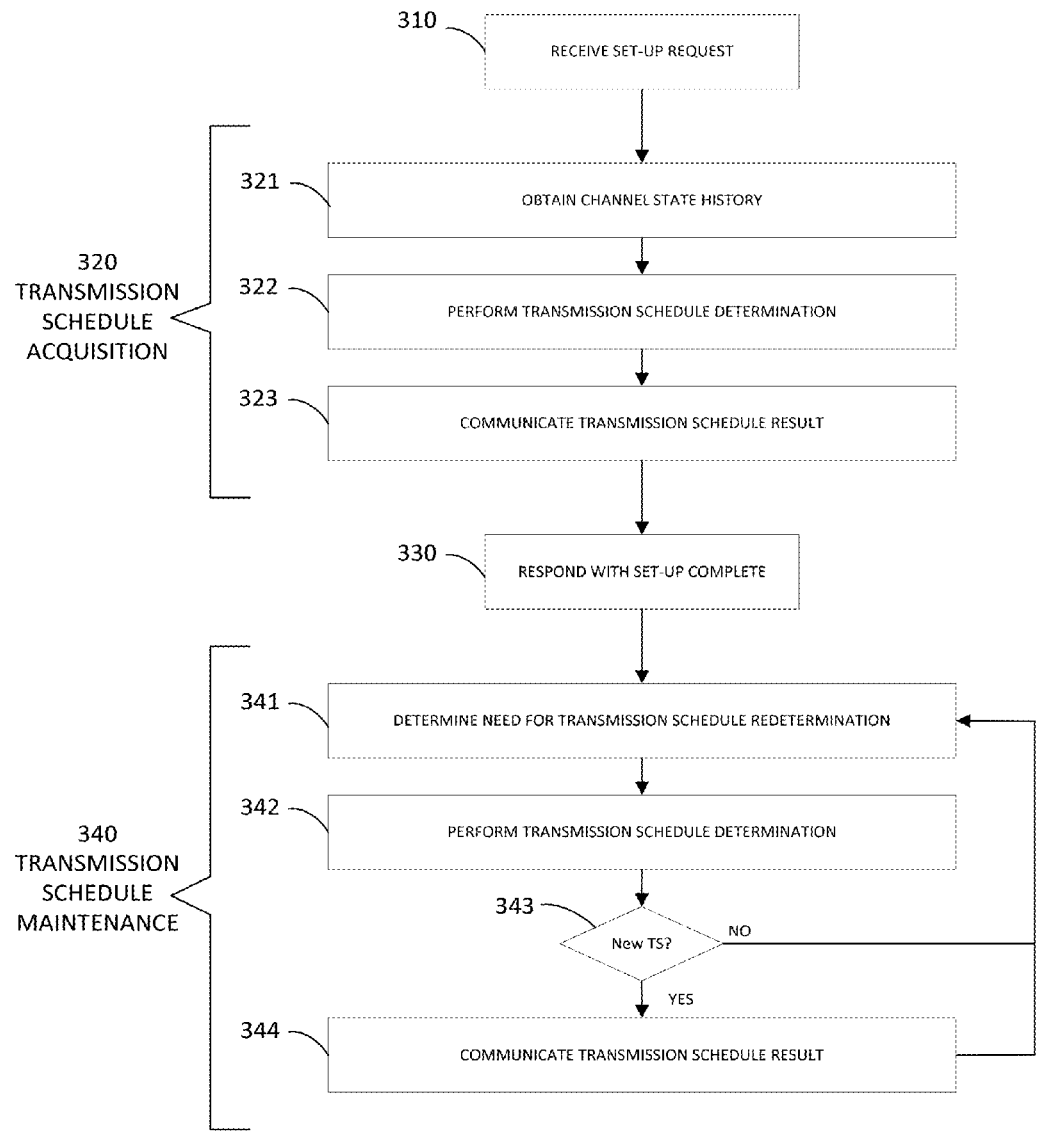
FIG. 3 is a flow chart illustrating an example process for transmission schedule determination according to an aspect of the present disclosure.

As shown in FIG. 3, the Transmission Schedule Determination Process may be composed of two sequential sub-processes. The first sub-process is Transmission Schedule Acquisition 320, which establishes an initial Transmission Schedule (TS) 242. Thereafter, TS updates are determined by the Transmission Schedule Maintenance 340 sub-process.

Transmission Schedule Acquisition 320 is initiated, in Step 310, by TSC 232 receiving a Set-up Request 240 to start operation for an S-stream. For example, Set-up Request 240 may be generated by Traffic Analyzer 235 by determining that a new S-stream exists in packets 225. Such determination may be performed by inspecting the contents of packets 225, by analyzing the sizes of packets 225, by analyzing the time of arrival characteristics of packets 225 or by some combination of two or more of these considerations. For example, packets 225 may contain an identifier, such as port number, which is unique per HLPS application or service. This identifier may be inspected by Traffic Analyzer 235 and, upon the detection of a new identifier value, Set-up Request 240 is generated.

Alternatively, Set-up Request 240 may be provided by another protocol layer, such as HLPS 220, which initiates the S-stream. (Arrows depicting the set-up request and other control signals between HLPS 220 and Soft-TDMA 230 have been omitted in FIG. 2 for clarity.)

Set-up Request 240 may include two parameters that characterize the S-stream: (1) a maximum delay value and (2) a reference packet size of packets 225. The maximum delay value is the largest delay that can be imposed on a packet 225 before the packet 225 is transmitted onto the wireless medium in the absence of channel contention. The maximum delay value may be used to calculate $T_P$. The reference packet size of packets 225 is an input to the determination of the transmission duration allowance ($T_{tx}$) for the stream as described below in the section entitled "Transmission Duration Allowance ($T_{tx}$)."

For the scenario where set-up request 240 is generated by HLPS 220, a maximum delay value and a reference packet size may be determined by the application generating the packets.

For the scenario where set-up request 240 is generated by traffic analyzer 235, a maximum delay value and a reference packet size may be determined as follows:

For packets generated periodically by HLPS 220, the maximum delay value may be equal to the time interval between a packet 225 and a subsequent packet 225, both packets being associated with the same S-stream. Multiple time intervals may be measured and averaged to determine the maximum delay value. Other ways to calculate the maximum delay value may include statistical thresholding, such as taking a percentile level.

For aperiodic traffic, the maximum delay value is governed by quality-of-service (QoS) requirements for the packet stream. This QoS requirement may be provided, for example, by HLPS 220 in the set-up request or may be a fixed, default value or a configurable parameter stored in memory.

For both periodic and aperiodic traffic, the reference packet size may be determined by calculating the average packet size for some quantity of packets associated with an S-stream. As above, other ways to calculate the reference packet size may include statistical thresholding, such as taking a percentile level.

In step 321, TSC 232 obtains CSI 241 from CSH 231 and determines whether CSI 241 is sufficient to support an initial TS determination. If sufficient CSI 241 is not available, TSC 232 may wait until sufficient CSI 241 is available before proceeding to step 322. Alternatively, TSC 232 may decide to proceed with incomplete CSH 231, for example, if the delay to acquire sufficient CSI 241 is deemed unacceptable. In an embodiment, sufficiency of CSI 241 is defined as having CSI for an immediately preceding time period equal to or greater than a threshold value. For example, CSI 241 may be deemed sufficient if it covers a time period equal to or greater than 400 milliseconds.

One skilled in the art would appreciate that one or more methods of interaction between TSC 232 and CSH 231 may be employed to communicate CSI 241 on a periodic or as-needed basis.

In step 322, TSC 232 performs the TS determination. TS determination is described in further detail below in the subsection entitled "Transmission Schedule Determination."

In Step 323, TSC 232 communicates the resulting TS 242 to TC 233. Upon receiving a TS 242, TC 233 aligns subsequent transmissions for packets associated with the S-stream according to the received TS 242. The next packet transmission may occur at a time specified by the TTA in TS 242. Thereafter, subsequent transmissions may occur at intervals of $T_P$.

Optionally in step 323, TSC 232 may provide Transmission Time Adjustment Information 226 to HLPS 220.

In optional step 330, Soft-TDMA may provide notification that initiation of operation for an S-stream has been completed by responding to the Set-up Request 240 with a Set-up Complete 249. This notification indicates that Soft-TDMA is ready to process Packets 225 of an S-stream for transmission onto the medium. In an embodiment, HLPS 220 does not start delivering packets 225 for an S-stream until a Set-up Complete 249 is received.

While determination of an initial TS 242 allows Soft-TDMA operation to begin for an S-stream, for various reasons the initial TS 242 may not be the best TS to use as operation progresses. For example, movement of wireless nodes may have caused two or more wireless nodes with conflicting TSs to be within each other's RF range and thereby, begin to experience contending or colliding transmissions. In these or other situations, the transmission performance of these wireless nodes can be improved by redetermination of TS using Transmission Schedule Maintenance sub-process 340. Transmission Schedule Maintenance sub-process 340 is responsible for detection of conditions that may trigger redetermination of TS and for performing this redetermination. The detection of redetermination conditions is described below in the subsection entitled "Redetermination Conditions."

In step 341, TSC 232 determines when a TS redetermination is required. This determination may be performed continuously or periodically. In an embodiment, this determination step is replaced by a time delay (e.g., 5 seconds), thus creating a periodic, rather than a conditional redetermination process.

If TS redetermination is needed, flow proceeds to step 342 in which TSC 232 attempts to determine an improved TS. If a new TS is determined at step 343, flow proceeds to step 344 in which an updated TS 242 is provided to Transmission Control 233, and (optionally) an updated Transmission Time Adjustment Information 226 may be provided to HLPS 220. Thereafter, the Transmission Schedule Maintenance sub-process 340 returns to step 341.

If no new TS is determined in step 343, then flow returns to step 341.

TSC 232 may perform TS determination differently in step 342 than in step 322. For example, TSC 232 may use a different duration of CSI 241 from CSH 231. TS determination is described in greater detail below in the subsection entitled "Transmission Schedule Determination."

At any time, another Set-up Request 240 may be received with updated parameter values for the S-stream. On such occurrence, operation returns to Transmission Schedule Acquisition 320 for the S-stream.

At any time, a Termination Request 250 may be received for an S-stream. On such occurrence, Soft-TDMA operation for the S-stream is terminated. Thereafter, any packets 225 for the S-stream may be sent to MAC 210 without delay or alternatively, may be dropped.

Multiple transmission schedule determination processes may operate in parallel to support multiple S-streams within a wireless node. For example, a transmission schedule determination process in support of an existing S-stream S1 may be performing transmission schedule maintenance 340 at the same time as a $2^{hd}$ transmission schedule determination process in support of a new S-stream S2 may be performing transmission schedule acquisition 320, or receiving a set-up request 240. In an embodiment, the transmission schedule determination processes for multiple S-streams within a wireless node may determine TSs independently using CSI 241 from a common CSH 231.

Transmission Schedule Determination

Transmission Schedule (TS) determination is the procedure by which a suitable periodic schedule of packet release times for an S-stream is determined in order to minimize channel contention. TS determination is performed by TSC 232.

TS determination uses CSI 241 to determine a TTA and a repetition interval $T_P$.

Firstly, the value of $T_P$ is determined. $T_P$ may be set to the maximum delay value from Setup Request 240. For example, if the maximum delay value is 100 mS for an S-stream, then $T_P$ may be set to 100 mS for that S-stream. Alternatively, $T_P$ may be set to a value less than the maximum delay value.

Figure 4:
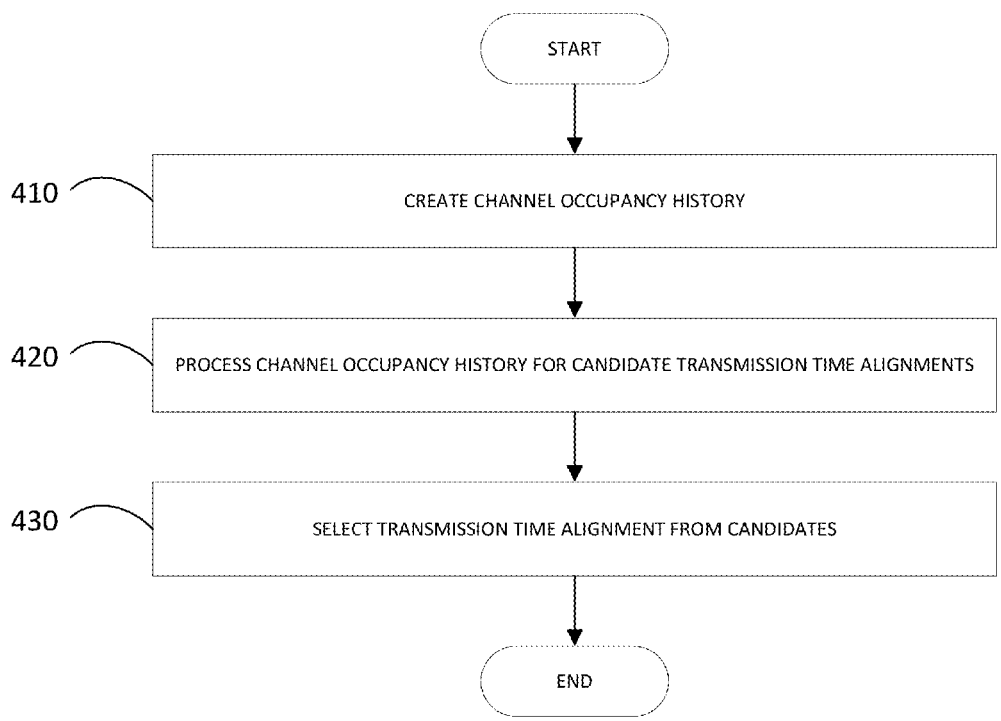
FIG. 4 is a flow chart illustrating an example process for determining a transmission time alignment value according to an aspect of the present disclosure.

Secondly, the value of TTA is determined. In an embodiment, this TTA determination comprises a 3-step procedure as described in FIG. 4. In a first step 410, input CSI 241 is processed to determine channel occupancy history as a function of time. Channel occupancy history may be determined for a specified period of time and may be based on transmissions generated by other S-streams within the node, and by transmissions from other nodes. Channel occupancy may also include information on the relative intensity of the transmissions as detected by the wireless node, for example, as represented by received signal strength (RSS).

In a next step 420, the channel occupancy history is processed to provide a set of candidate TTAs. In a third step 430, a new TTA is selected from the set of candidate TTAs if the set is not empty. If the set is empty, TTA determination may be repeated as described further below or the current TTA may be retained.

In an embodiment, step 410 processes CSI 241 to create a channel occupancy history over an interval equal to $T_P$ of the S-stream. In an embodiment, the processing is a summation according to Eq. (1):

$$Ch_{occ}(t) = \sum_{i=0}^{N_H - 1} a_i * CSI(t - i * T_p), \quad \text{Eq. (1)}$$

where $t = [-T_p, 0[$ where CSI ($\tau$) is the value of CSI at time $\tau$, $N_H$ is an integer number of transmission periods $T_P$ that defines how far back in time to process CSI 241 and $a_i$ is a weighting factor that may be used to influence the relative contribution of CSI values for each interval. $Ch_{occ}(t)$ may be normalized by dividing by $N_H$ to allow relative comparisons to CSI values. In an embodiment, a CSI($\tau$) may be a CSV 216 or an equivalent CSV representation of STI 243.

In step 420, TTA determination processes $Ch_{occ}(t)$ to obtain a set of candidate TTAs. A candidate TTA may be located in any contiguous interval of length equal to or greater than a minimum length $T_{min}$ where $Ch_{occ}(t)$ is less than a threshold value $Ch_{thr}$. In an embodiment, $T_{min}$ is equal to the transmission duration allowance ($T_{tx}$). In an embodiment, the set of candidate TTAs includes one or more TTAs that result in $T_{tx}$ which do not overlap in time. In a further embodiment, termed "Method-A," the set of candidate TTAs includes all candidate TTAs which do not have overlapping $T_{tx}$. In another embodiment, termed "Method-B," the set of candidate TTAs includes only the TTAs which do not have overlapping $T_{tx}$ and where $T_{tx}$ is adjacent to other transmissions on the channel.

TTA determination is deemed successful if the number of candidate TTAs in the resulting set of candidate TTAs is greater than or equal to a minimum threshold. As one skilled in the art would appreciate, there are a number of ways by which the minimum threshold can be determined. For example, the minimum threshold may be fixed by the implementation or may be determined via configuration. The value of the minimum threshold may be different for different methods of TTA determination. The value of the minimum threshold may be fixed, for example, fixed to a value of 1. The value of the minimum threshold may be adaptive. For example, the value of the minimum threshold may be set proportionally to the number of wireless nodes from which transmissions have been detected within a recent time interval.

Upon successful completion of TTA determination, in step 430, one TTA is selected for use from the set of candidate TTAs. In an embodiment, the TTA to use is selected at random from the set of candidate TTAs based on a uniform probability distribution.

The process of TTA determination may be iterative if the initial or a subsequent attempt was not successful. In an embodiment, TTA determination may iterate using the same method or algorithm or set of methods or algorithms but with different parameter settings. For example, in the TTA determination method of FIG. 4, steps 420 and 430 may be repeated in sequence with different parameter settings, such as different values of $Ch_{thr}$, until successful or a maximum limit on the number of iterations is surpassed. In another embodiment, TTA determination may iterate using different methods or algorithms at each iteration. For example, in the TTA determination method of FIG. 4, steps 420 and 430 may be repeated in sequence using different methods of deriving the set of candidate TTAs, such as Method-B followed by Method-A.

Redetermination Conditions

Redetermination may need to be performed in three situations. In one situation, termed "Type A," gaps between transmissions result in poor channel utilization. In such a scenario, an incremental adjustment of the TTA relative to its current setting may be used to improve performance. In a second situation, termed "Type B," contention between two transmissions occurs, resulting in either packet loss or a deferral of transmission, such as a backoff according to the CSMA/CA protocol. In such a scenario, redetermination may be used to find a new TS which may have no relationship with the current TS. In a third situation, termed "Type C," redetermination may be performed periodically (e.g., following the expiration of a timer) or upon receipt of a message such as Set-up Request 240 from another function (e.g., HLPS 220) that reinitializes an active S-stream.

In an embodiment, the need for TS redetermination (e.g., in step 341 of FIG. 3) may be based on the presence or detection of one or more of Type A, Type B or Type C conditions or situations.

Type-A Redetermination Conditions

Figure 5:
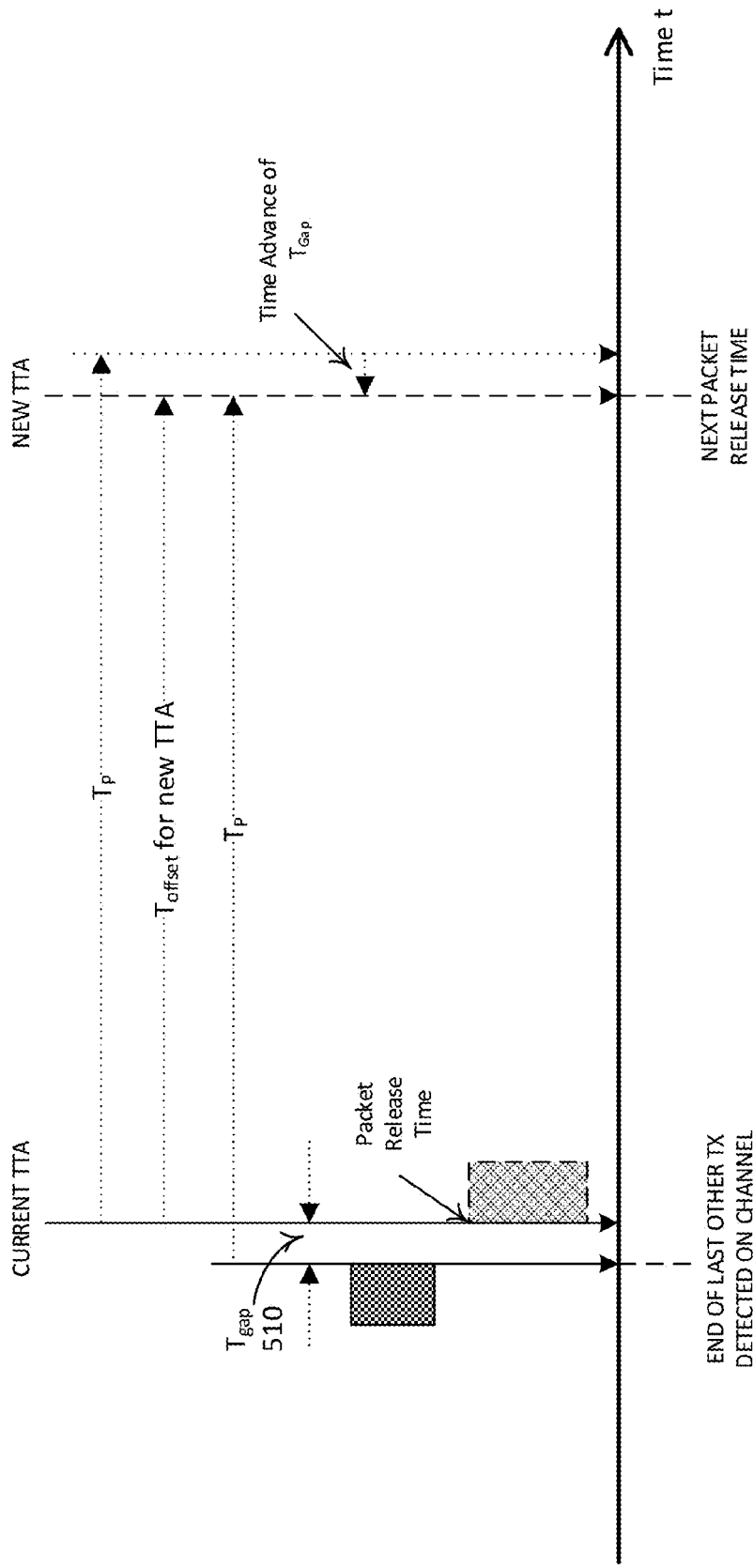
FIG. 5 is a graphical illustration showing a condition in which a time gap in channel occupancy history less than a predetermined duration exists from the end of the immediately preceding transmission detected on the channel to the packet release times of an S-stream in accordance with an aspect of the present disclosure.

In an embodiment, redetermination may be performed for a Type-A condition in which a time gap in channel occupancy history less than $T_{tx}$ in duration exists from the end of the immediately preceding transmission detected on the channel to the packet release times of an S-stream, as depicted by $T_{gap}$ 510 in FIG. 5. The detection of such a time gap may be used in Step 342 to determine a new TTA advanced in time by a period equal to $T_{gap}$ 510, as shown in FIG. 5.

Alternatively, redetermination may be performed for a Type-A condition in which a time gap less than $T_{tx}$ exists between the end of the transmission of an S-stream and the start of the next transmission detected on the channel. In this case, a new TTA may be determined in which the next transmission of the S-stream would be delayed by an additional time equal to $T_{gap}$.

Type B Redetermination Conditions

In an embodiment, redetermination may be performed for a Type-B redetermination condition in which two or more wireless nodes are operating with TSs that result in overlapping transmission attempts, thereby resulting in a state of channel contention.

Channel Access Delay (CAD) may be defined to be the time taken for a packet 215 entering MAC 210 to be transmitted onto the medium. The presence of channel contention may cause an increase in the measured value of CAD due to the occurrence of transmission back-off when the channel is detected as being in use at the time a transmission is initiated in a contention-based MAC. In an embodiment, redetermination may be performed for an S-stream when the CAD for transmitted packets 215 is greater than a minimum threshold for some period of time. For example, redetermination may be performed when the CAD, as provided in CSV 216, is greater than 50 mS over a period of 1 second for packets associated with an S-stream. In another embodiment, redetermination may be performed for an S-stream when the CAD for transmitted packets 215 is greater than a minimum threshold for a certain percentage of packets over some period of time. For example, redetermination may be performed when the CAD is greater than 50 mS for 70 percent of the packets transmitted over a period of 1 second.

Type C Redetermination Conditions

A Type C condition occurs when TSC 232 receives an event that triggers an immediate TS determination. In an embodiment, a Type C condition may be the expiration of a timer that limits the time elapsed since the last TS determination was performed. In another embodiment, a Type C condition may be the reception of a message such as Set-up Request 240 from another function (e.g., HLPS 220) that reinitializes an active S-stream.

Persistence of a Redetermination Condition

In step 341, TSC 232 determines the existence of a redetermination condition and validates the persistence of the condition before proceeding to perform TS determination in step 342.

In an embodiment, persistence may be based on a minimum count or minimum percentage of samples in which the redetermination condition existed over a persistence time interval.

The persistence time interval used for the different redetermination conditions may be the same or different. For example, the persistence time interval used for the Type-A redetermination condition may be shorter than for any Type-B redetermination condition.

The persistence time interval may be different for different wireless nodes. In an embodiment, the persistence time interval for a type of redetermination condition may be randomly chosen by each wireless node to be a value between a minimum and maximum time interval value and according to a probability distribution. For example, the distribution used may be a uniform distribution or may be a distribution that monotonically decays or increases from minimum value to the maximum value.

In a further embodiment, the persistence time interval used may be changed over time. For example, the persistence time interval for a particular redetermination condition may be changed after each pass through step 342 for an S-stream.

Transmission Duration Allowance ($T_{tx}$)

Figure 6:
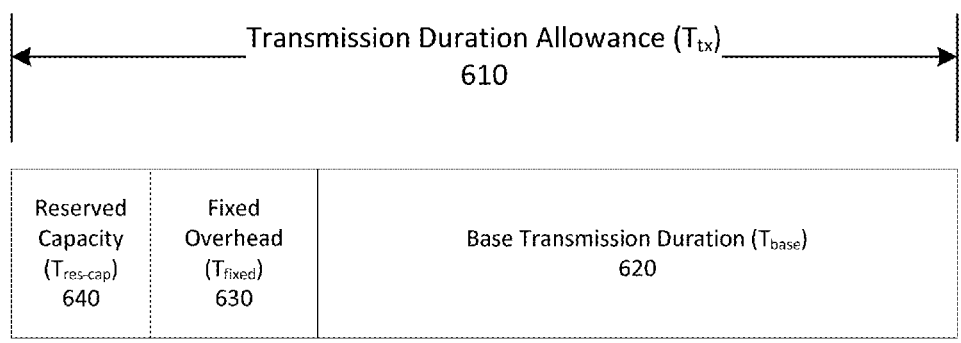
FIG. 6 is a graphical illustration showing factors that may be used to calculate a time duration allowance in accordance with an aspect of the present disclosure.

FIG. 6 shows factors that may be used to calculate $T_{tx}$ 610. Firstly, a base transmission time duration ($T_{base}$) 620 may be determined based on the reference packet size for the S-stream (e.g., as supplied in Set-Up Request 240) and may further include protocol overheads that may be added by lower protocol layers following egress from the soft-TDMA system. One skilled in the art would appreciate how to determine the effect that lower protocol layers, which process packets after egress from the soft TDMA system, have on packet size.

Secondly, a time $T_{fixed}$ 630 may be added to account for fixed time overheads required by Soft-TDMA or the underlying protocol layers. Examples of $T_{fixed}$ 630 include: (1) the minimum time needed between transmissions within the network to account for differences in propagation delays between different pairs of wireless nodes, and (2) a minimum time gap between transmissions due to the underlying MAC protocol, such as the inter-frame spacing for Distributed Coordination Function (DCF) in IEEE 802.11. $T_{fixed}$ 630 may be determined and applied as an absolute time value (e.g., 50 μs) or as a percentage (e.g., 10%) of $T_{base}$.

Thirdly, a time $T_{res-cap}$ 640 may be added for reservation of channel capacity to address other transmission needs. Examples of $T_{res-cap}$ 640 include capacity needs in support of: (1) non-periodic traffic, (2) packets longer than $T_{base}$, and (3) over-provisioning to ensure performance requirements such as maximum transfer delay can be satisfied. $T_{res-cap}$ 640 may be an absolute time value (e.g., 100 μs). Alternatively $T_{res-cap}$ 640 may be a time value which is a percentage (e.g., 20%) of $T_{base}$ or $T_{fixed}+T_{base}$. This latter method may be viewed as using $T_{res-cap}$ 640 to essentially place a percentage of available system capacity in reserve.

In an embodiment, $T_{tx}$ 610 may be calculated as the sum of $T_{base}$ 620, $T_{fixed}$ 630, and $T_{res-cap}$ 640 where $T_{fixed}$ 630 and $T_{res-cap}$ 640 are optional.

Collision Avoidance Using an Extended $T_{tx}$

TS determination by two or more wireless nodes at approximately the same time may result in multiple wireless nodes using the same TS. This determination may cause a persistent state of collision of transmissions between these nodes depending on the protocol behavior of MAC 210. For example, in the IEEE 802.11 DCF mode of MAC operation, broadcast transmissions sent onto the medium by two or more nodes at the same time collide without any detectable error condition at the transmitter.

Figure 7:
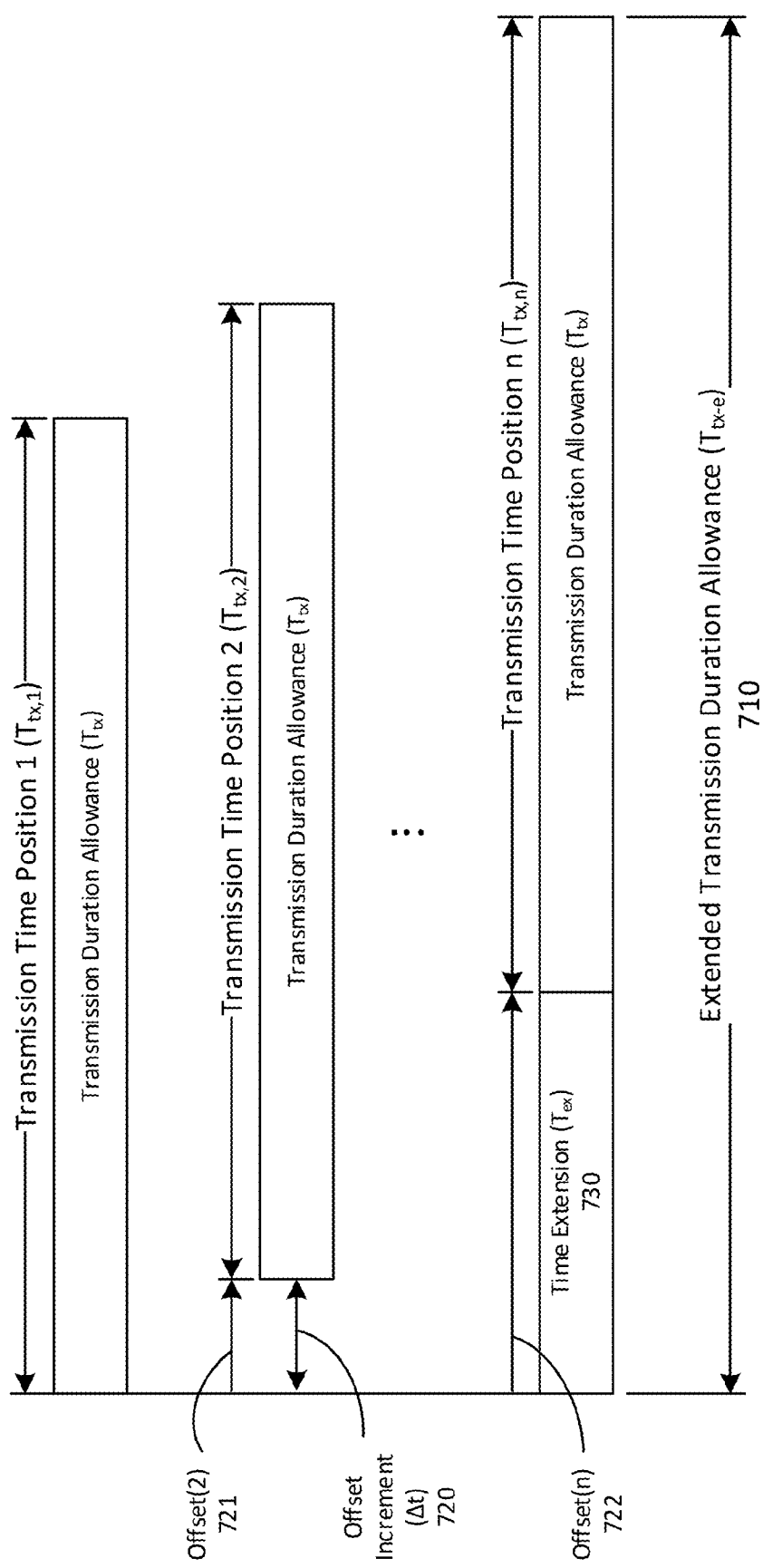
FIG. 7 is a graphical illustration showing the use of an extended transmission duration allowance in order to avoid a state of colliding transmissions in accordance with an aspect of the present disclosure.

TSC 232 may use an extended transmission duration allowance ($T_{tx-e}$) 710 as shown in FIG. 7 in the place of $T_{tx}$ in order to avoid a state of colliding transmissions from two or more wireless nodes that may have determined coincident TSs.

An extended transmission duration allowance ($T_{tx-e}$) 710 is formed by adding a time extension ($T_{ex}$) 730 to the basic transmission duration allowance ($T_{tx}$) 610. A number of different transmission time positions are formed by aligning $T_{tx}$ 610 at different offsets within $T_{ex}$ 730. The length of $T_{ex}$ 730 may be equal to (n−1)*Δt where Δt is an offset increment and n is the number of different offsets desired.

For each transmission of a packet associated with an S-stream, Transmission Control 233 selects an offset to use from the n that are available within $T_{tx-e}$. In an embodiment, an offset is selected randomly from the n that are available. In a further embodiment, the random selection is based on a uniform distribution. In an alternative embodiment, the random selection is based on a non-uniform type of distribution. For example, the probability distribution may be set so that the probability of selecting the earliest (first) offset is lower than later (higher) offsets. In a further embodiment, the random distribution used for offset selection may be changed for an S-stream. For example, the distribution may be changed between a uniform distribution and a non-uniform distribution based on the number of wireless nodes from which transmissions have been detected within a recent time interval.

In an embodiment, the value of Δt is equal to or greater than the time required by the underlying MAC 210 to detect a busy condition on the channel. In this case, the wireless node selecting the earliest offset should start transmission successfully if no other contending wireless node selects this earliest offset. Contending wireless nodes selecting a later offset within a $T_{tx-e}$ should defer their transmissions on detecting a busy channel when they attempt to start transmission. This deferral action prevents a loss of packet due to collision but causes additional transmission delay due to the deferral.

Packet Transmission Process

Figure 8:
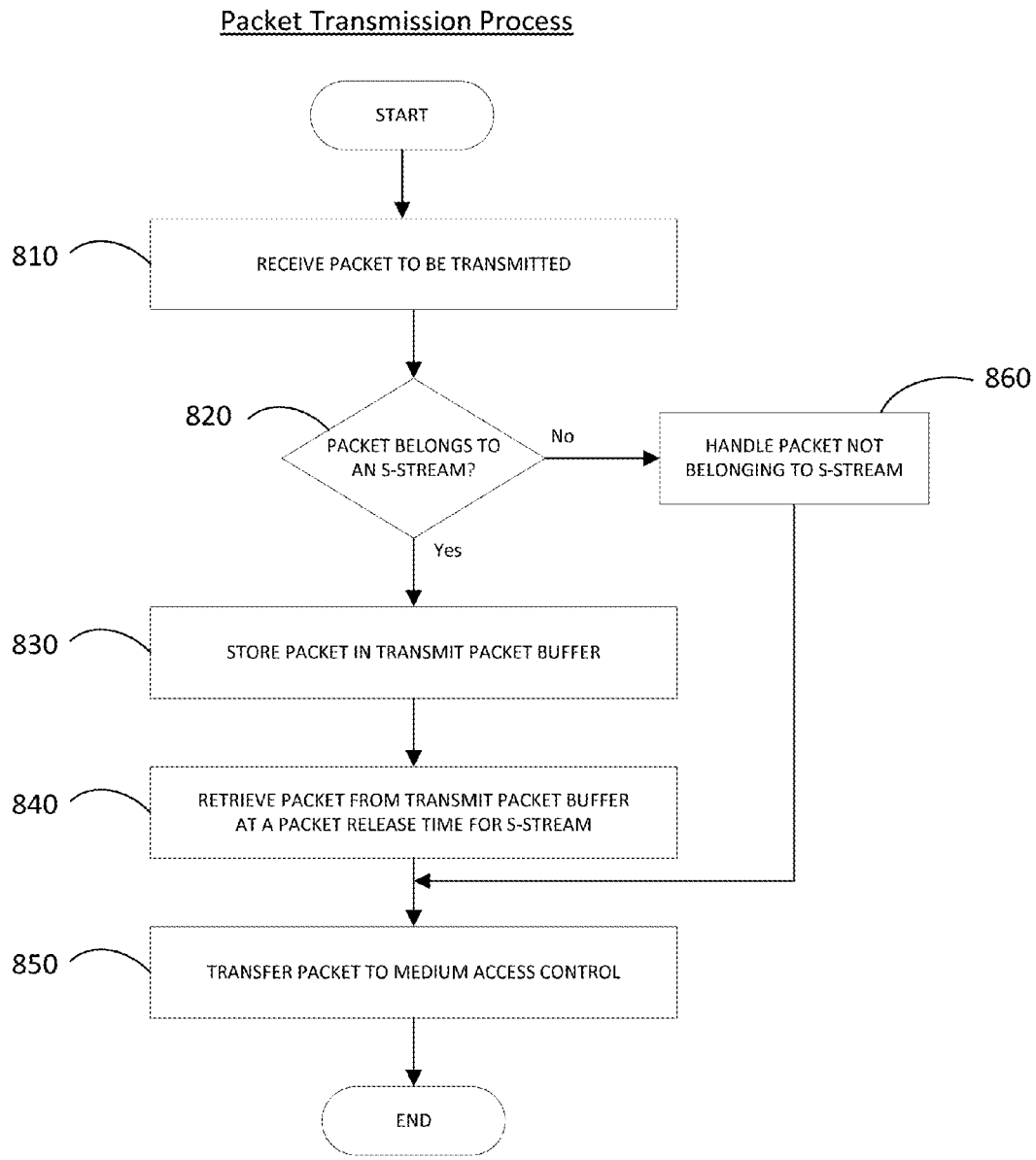
FIG. 8 is a flow chart illustrating an example process applied to a packet in the data-path processing through Soft-TDMA according to an aspect of the present disclosure.

FIG. 8 describes the steps applied to packet 225 in the data-path processing through Soft-TDMA, specifically Traffic Analyzer 235, Transmit Packet Buffer 234 and Transmission Control 233. In Step 810, Traffic Analyzer 235 receives a packet 225 for transmission. In Step 820, Traffic Analyzer 235 analyzes the packet and determines if the packet belongs to an active S-stream. Traffic Analyzer 235 may determine the S-stream associated with a packet 225 by comparing the value in a field or set of fields in the packet with a value or set of values, respectively, that are unique to the S-stream. For example, Traffic Analyzer 235 may identify the S-stream for a packet 225 by a unique value of a port number field in the packet, such as a Provider Service Identifier (PSID) in Wireless Access in Vehicular Environments (WAVE) short messages according to IEEE 1609.3 and IEEE 1609.12 standards. Alternatively to, or in addition to, using the value of packet contents, Traffic Analyzer 235 may determine the S-stream associated with a packet 225 by its time-of-arrival characteristics from HLPS 220, such as by comparing the packet's time of arrival with an expected time of arrival value or range.

If Traffic Analyzer 235 determines that the packet does not belong to an active S-stream, flow continues to step 860 where Traffic Analyzer 235 may transfer packet 225 to TC 233 for sending without delay to MAC 210 in step 850. Alternatively in step 860, Traffic Analyzer 235 may discard the packet.

If packet 225 belongs to an active S-stream, flow proceeds to step 830. In step 830, Traffic Analyzer 235 stores the packet 225 in Transmit Packet Buffer 234. In step 840, at a packet release time according to the TS 242 of an S-stream, Transmission Control 233 retrieves a packet 225 for the S-stream from the Transmit Packet Buffer 234.

In step 850, TC 233 transfers the packet 215 to MAC 210 for transmission onto the medium.

Packets 225 from more than one S-stream may be stored in Transmit Packet Buffer 234. As one skilled in the art would appreciate, there are various ways in which packets may be organized within Transmit Packet Buffer 234 to allow retrieval of packets 225 according to S-stream. For example, packets 225 for different S-streams may be stored in separate queues within Transmit Packet Buffer 234.

Network System

Figure 9:
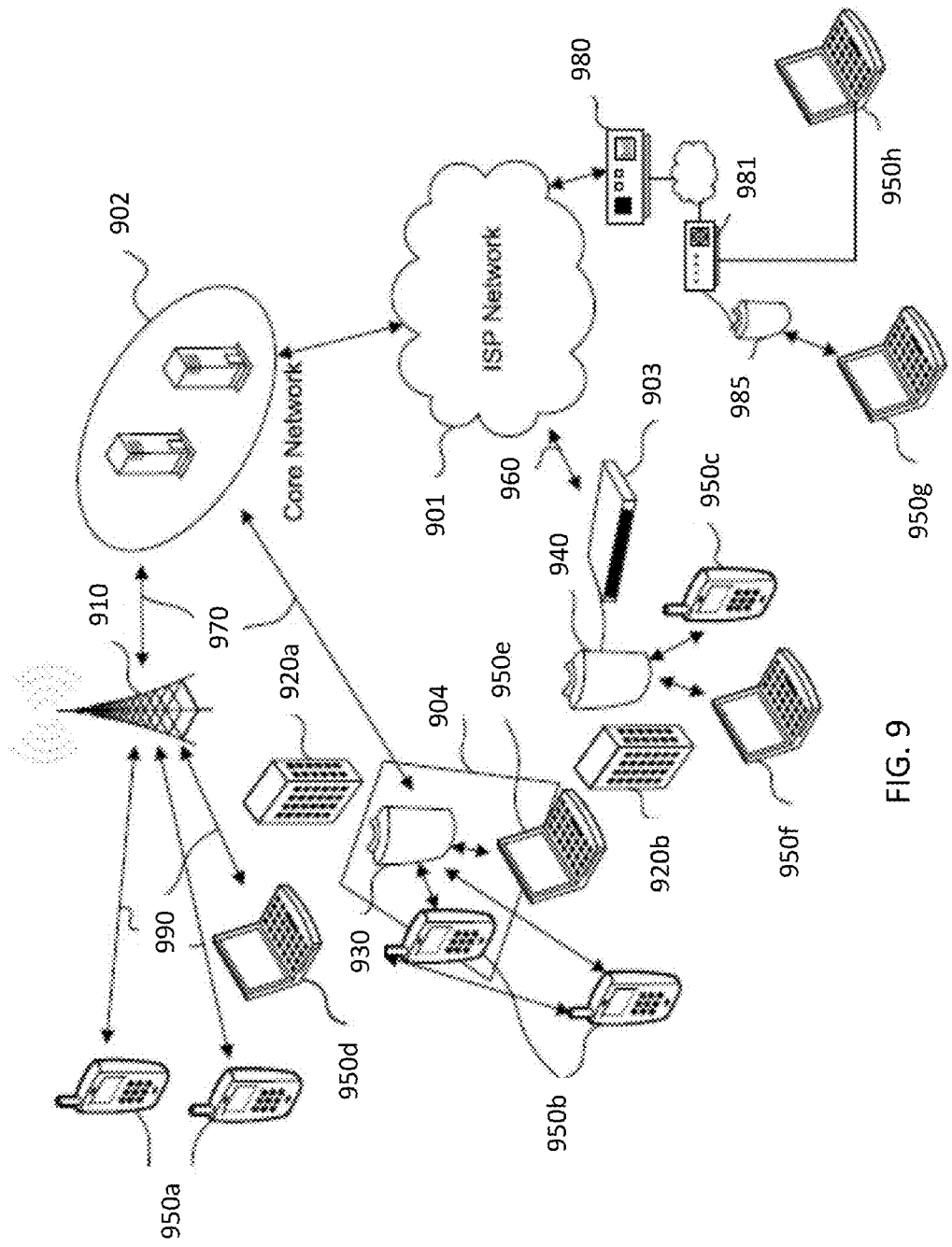
FIG. 9 is a block diagram of an example network system in which aspects of the disclosure may be implemented.

FIG. 9 is a block diagram of a communication network in which features disclosed herein can be implemented in accordance with aspects of the invention. A macro base station 910 is connected to a core network 902 through a backhaul connection 970. In an embodiment, the backhaul connection 970 is a bidirectional link or two unidirectional links. The direction from the core network 902 to the macro base station 910 is referred to as the downstream or downlink (DL) direction. The direction from the macro base station 910 to the core network 902 is referred to as the upstream or uplink (UL) direction. Subscriber stations 950*a* and 950*d* can connect to the core network 902 through the macro base station 910. Wireless links 990 between subscriber stations 950*a* and 950*d* and the macro base station 910 are bidirectional point-to-multipoint links, in an embodiment. The direction of the wireless links 990 from the macro base station 910 to the subscriber stations 950*a* and 950*d* is referred to as the downlink or downstream direction. The direction of the wireless links 990 from the subscriber stations 950*a* and 950*d* to the macro base station 910 is referred to as the uplink or upstream direction. Subscriber stations are sometimes referred to as user equipment (UE), users, user devices, handsets, terminal nodes, or user terminals and are often mobile devices such as smart phones or tablets. The subscriber stations 950*a* and 950*d* access content over the wireless links 990 using base stations, such as the macro base station 910, as a bridge. That is to say, the base stations generally pass user application data and any user application control messages between the subscriber stations 950*a* and 950*d* and the core network 902 without the base station being a destination for the data and control messages or a source of the data and control messages.

In the network configuration illustrated in FIG. 9, an office building 920*a* causes a coverage shadow 904. A pico station 930 can provide coverage to subscriber stations 950*b* and 950*e* in the coverage shadow 904. The pico station 930 is connected to the core network 902 via a backhaul connection 970. The subscriber stations 950*b* and 950*e* may be connected to the pico station 930 via links that are similar to or the same as the wireless links 990 between subscriber stations 950*a* and 950*d* and the macro base station 910.

In office building 920*b*, an enterprise femtocell 940 provides in-building coverage to subscriber stations 950*c* and 950*f*. The enterprise femtocell 940 can connect to the core network 902 via an internet service provider network 901 by utilizing a broadband connection 960 provided by an enterprise gateway 903.

In addition, internet service provider network 901 may also provide a broadband connection between core network 902 and cable head end 980, which may be a cable head end of a local, regional or national digital cable service. Cable head end 980 is connected to a large number of set top boxes and cable modems, such as cable modem 981, by a network of cables or other wired connections. Cable modem 981 may be provided in a residence or a business location and is seen in FIG. 9 to provide internet connectivity to subscriber stations 950*g* and 950*h*. In this regard, cable modem 981 in FIG. 9 is connected to access point 985 which provides wireless coverage to subscriber station 950*g* via a Wi-Fi (802.11) wireless connection. Subscriber station 950*h* is shown in FIG. 9 as being directly wired to cable modem 981 via an Ethernet connection or other wired connection.

It should be noted that one or more of the subscriber stations (user equipment) depicted in FIG. 9 may be within the coverage are of one or more base stations (access points), and therefore have the choice of deciding which base station to connect with. The decision of which base station a subscriber station will connect with may depend on many factors, which may include the type of wireless technology that is supported by each particular base station (access point). For example, referring to FIG. 9, subscriber station 950*d* may be within the coverage area of both pico station 930 and base station 910, and therefore would need to decide which one to connect with. Similarly, subscriber station 950*c* may be within the coverage area of base station 910, pico station 930, femtocell 940 and Wi-Fi access point 985, and therefore would need to decide which one to connect with.

FIG. 9 also illustrates a network configuration in which two or more subscriber stations 950*b* may communicate directly with each other. In some such network configurations, the network may be comprised solely of such subscriber stations 950*b* that communicate directly with other subscriber stations 950*b*. In other configurations, subscriber stations 950*b* may communicate directly with other subscriber stations 950*b* in addition to communicating with base stations, such as pico station 930.

Access Node

Figure 10:
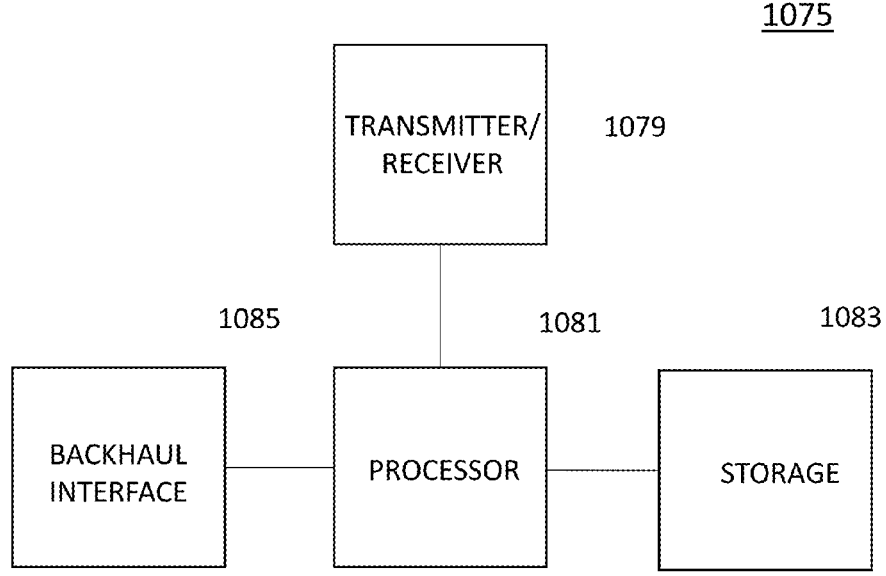
FIG. 10 is a block diagram of an example access node in accordance with aspects of the present disclosure.

FIG. 10 is a functional block diagram of an access node 1075 in accordance with aspects of the invention. In various embodiments, the access node 1075 may be a mobile WiMAX base station (BS), a global system for mobile (GSM) wireless base transceiver station (BTS), a Universal Mobile Telecommunications System (UMTS) NodeB, an LTE evolved Node B (eNB or eNodeB), a cable modem head end, a Wi-Fi access point, a DSRC Roadside Unit (RSU), or other wireline or wireless access node of various form factors. For example, the macro base station 910, the pico station 930, or the enterprise femtocell 940 of FIG. 9 may be provided, for example, by the access node 1075 of FIG. 10. The access node 1075 includes a processor 1081. The processor 1081 is coupled to a transmitter-receiver (transceiver) 1079, a backhaul interface 1085, and a storage 1083.

The transmitter-receiver 1079 is configured to transmit and receive communications with other devices. In many implementations, the communications are transmitted and received wirelessly. In such implementations, the access node 1075 generally includes one or more antennae for transmission and reception of radio signals. In other implementations, the communications are transmitted and received over physical connections such as wires or optical cables. The communications of the transmitter-receiver 1079 may be with terminal nodes.

The backhaul interface 1085 provides communication between the access node 1075 and a core network. The communication may be over a backhaul connection, for example, the backhaul connection 970 of FIG. 9. Communications received via the transmitter-receiver 1079 may be transmitted, after processing, on the backhaul connection. Similarly, communication received from the backhaul connection may be transmitted by the transmitter-receiver 1079. Although the access node 1075 of FIG. 10 is shown with a single backhaul interface 1085, other embodiments of the access node 1075 may include multiple backhaul interfaces. Similarly, the access node 1075 may include multiple transmitter-receivers. The multiple backhaul interfaces and transmitter-receivers may operate according to different protocols.

The processor 1081 can process communications being received and transmitted by the access node 1075. The storage 1083 stores data for use by the processor 1081. The storage 1083 may also be used to store computer readable instructions for execution by the processor 1081. The computer readable instructions can be used by the access node 1075 for accomplishing the various functions of the access node 1075. In an embodiment, the storage 1083 or parts of the storage 1083 may be considered a non-transitory machine readable medium. For concise explanation, the access node 1075 or aspects of it are described as having certain functionality. It will be appreciated that in some aspects, this functionality is accomplished by the processor 1081 in conjunction with the storage 1083, transmitter-receiver 1079, and backhaul interface 1085. Furthermore, in addition to executing instructions, the processor 1081 may include specific purpose hardware to accomplish some functions.

User Equipment

Figure 11:
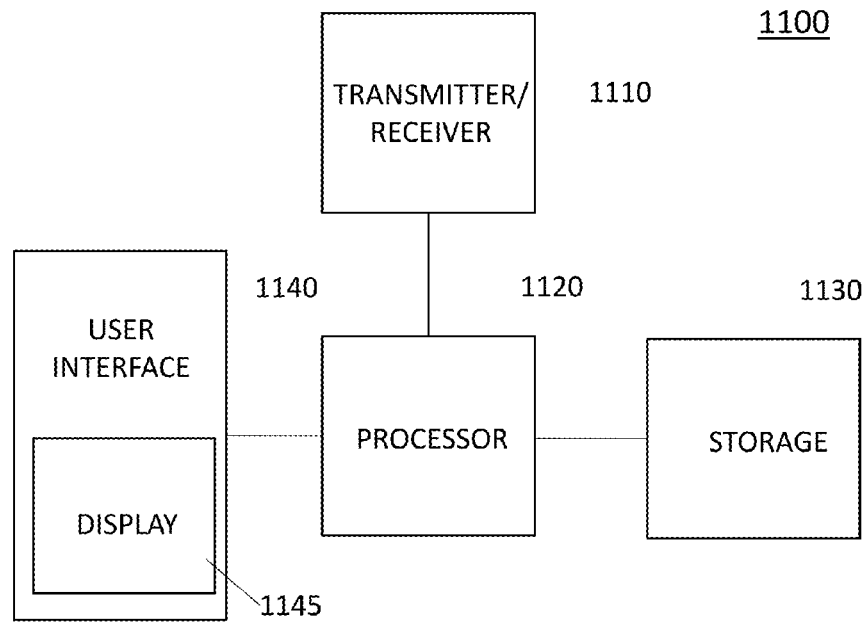
FIG. 11 is a block diagram of an example user equipment in accordance with aspects of the present disclosure.

FIG. 11 is a functional block diagram of a user equipment in accordance with aspects of the invention. The user equipment may be referred in different wireless technologies as a subscriber station, terminal node, mobile device, user device, mobile station (MS), onboard unit (OBU) or station (STA). The user equipment 1100 can be used for viewing streaming video. In various example embodiments, the user equipment 1100 may be a mobile device, for example, a smartphone or tablet or notebook computer or PDA. The user equipment 1100 includes a processor 1120. The processor 1120 is communicatively coupled to transmitter-receiver (transceiver) 1110, user interface 1140, and storage 1130. The processor 1120 may be a single processor, multiple processors, or a combination of one or more processors and additional logic such as application-specific integrated circuits (ASIC) or field programmable gate arrays (FPGA).

The transmitter-receiver 1110 is configured to transmit and receive communications with other devices. For example, the transmitter-receiver 1110 may communicate with a cellular or broadband base station such as an LTE evolved node B (eNodeB) or Wi-Fi access point (AP), or the transmitter-receiver 1110 may communicate directly with other user equipment devices. In example embodiments where the communications are wireless, the user equipment 1100 generally includes one or more antennae for transmission and reception of radio signals. In other example embodiments, the communications may be transmitted and received over physical connections such as wires or optical cables and the transmitter/receiver module 1110 may be an Ethernet adapter or cable modem. Although the user equipment 1100 of FIG. 11 is shown with a single transmitter-receiver 1110, other example embodiments of the user equipment 1100 may include multiple transmitter-receivers. The multiple transmitter-receivers may operate according to different protocols.

The user equipment 1100, in some example embodiments, provides data to and receives data from a person (user). Accordingly, the user equipment 1100 includes a user interface 1140. The user interface 1140 includes modules for communicating with a person. The user interface 1140, in an exemplary embodiment, may include a display 1145 for providing visual information to the user, including displaying video content. In some example embodiments, the display module 1145 may include a touch screen which may be used in place of or in combination with a keypad connected to the user interface module 1140. The touch screen may allow graphical selection of inputs in addition to alphanumeric inputs.

In an alternative example embodiment, the user interface module 1140 may include a computer interface, for example, a universal serial bus (USB) interface, to interface the user equipment 1100 to a computer. For example, a wireless modem, such as a dongle, may be connected, by a wired connection or a wireless connection, to a notebook computer via the user interface module 1140. Such a combination may be considered to be a user equipment 1100. The user interface module 1140 may have other configurations and include hardware and functionality such as speakers, microphones, vibrators, and lights.

The processor module 1120 can process communications received and transmitted by the user equipment 1100. The processor module 1120 can also process inputs from and outputs to the user interface module 1140. The storage module 1130 may store data for use by the processor module 1120, including images or metrics derived from images. The storage module 1130 may also be used to store computer readable instructions for execution by the processor module 1120. The computer readable instructions can be used by the user equipment 1100 for accomplishing the various functions of the user equipment 1100. Storage module 330 can also store received content, such as video content that is received via transmitter/receiver module 1110.

The storage module 1130 may also be used to store photos and videos. In an example embodiment, the storage module 1130 or parts of the storage module 1130 may be considered a non-transitory machine readable medium. In an example embodiment, storage module 1130 may include one or more subscriber identity module (SIM) or machine identity module (MIM).

For concise explanation, the user equipment 1100 or example embodiments of it are described as having certain functionality. It will be appreciated that in some example embodiments, this functionality is accomplished by the processor module 1120 in conjunction with the storage module 1130, the transmitter-receiver module 1110 and the user interface module 1140. Furthermore, in addition to executing instructions, the processor module 1120 may include specific purpose hardware to accomplish some functions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

The foregoing described aspects and features, and those provided in the accompanying documents, are susceptible to many variations. Additionally, for clarity and concision, many descriptions of the aspects and features have been simplified. For example, the figures generally illustrate one of each type of device (e.g., one access node, one user equipment), but a communication system may have many of each type of device. Similarly, many descriptions use terminology and structures of a specific wireless standard such as 802.11 Wi-Fi, LTE, and the like. However, the disclosed aspects and features are more broadly applicable, including for example, other types of wireless and network transfer protocols and other types of communication systems.

Those of skill will appreciate that the various illustrative logical blocks, modules, units, and algorithm steps described in connection with the embodiments disclosed herein, and those provided in the accompanying documents, can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein, and those provided in the accompanying documents, can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein, and those provided in the accompanying documents. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein, and those provided in the accompanying documents, can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described a transmitting data to (or receiving from) a second device when there are intermediary devices that couple the first and second device and also when the first device is unaware of the ultimate destination of the data.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language and conventional procedural programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The above description of the disclosed embodiments, and that provided in the accompanying documents, is provided to enable any person skilled in the art to make or use the invention. Various modifications to these embodiments will be readily apparent to those skilled in the art, and the generic principles described herein, and in the accompanying documents, can be applied to other embodiments without departing from the spirit or scope of the invention. Thus, it is to be understood that the description and drawings presented herein, and presented in the accompanying documents, represent particular aspects and embodiments of the invention and are therefore representative examples of the subject matter that is broadly contemplated by the present invention. It is further understood that the scope of the present invention fully encompasses other embodiments that are, or may become, obvious to those skilled in the art and that the scope of the present invention is accordingly not limited by the descriptions presented herein, or by the descriptions presented in the accompanying documents.

Having thus described the invention of the present application in detail and by reference to embodiments thereof, it will be apparent that modifications and variations are possible without departing from the scope of the invention defined in the appended claims as follows:

We claim:

1. A method of scheduling packets received from a higher layer packet source for transmission from a network device onto a medium shared with at least one contending network device where access to the medium is controlled by a medium access protocol, the method comprising:
    obtaining medium history information associated with the medium;
    determining, in the network device, a transmission schedule that provides for periodic opportunities to transmit a packet from the network device, the transmission schedule minimizing contention with transmission from the at least one contending network device by taking into account the medium history information associated with the medium;
    providing, to a medium access controller in the network device that operates in accordance with the medium access protocol, at least some of the packets based on the determined transmission schedule; and
    transmitting, from the network device, packets output from the medium access controller, wherein the transmission schedule comprises a time alignment parameter and a time period parameter, wherein the at least some of the packets are provided to the medium access controller based in part on the time alignment parameter and the time period parameter.

2. The method of claim 1, wherein the time period parameter is based on a reception time period at which packets are received from the higher layer packet source.

3. The method of claim 1, wherein the time alignment parameter is based on a transmission duration allowance parameter and on the medium history information.

4. The method of claim 1, wherein the medium history information includes received signal strength information.

5. The method of claim 1, wherein the time alignment parameter is based on an extended transmission duration allowance parameter and on the medium history information, wherein the extended transmission duration allowance parameter includes a plurality of time offsets and the time alignment parameter is based on a selection of one of the plurality of time offsets.

6. The method of claim 1, further including modifying the transmission schedule by adjusting the time alignment parameter to reduce a time gap between a transmission from the network device and a transmission from the at least one contending network device.

7. The method of claim 1, further including:
    obtaining updated medium history information associated with the medium; and
    modifying, in the network device, the transmission schedule based at least in part on the updated medium history information associated with the medium.

8. The method of claim 7, wherein obtaining updated medium history information is conducted upon a determination that contention has occurred on the medium with the one or more of the at least one contending network device.

9. The method of claim 1, wherein a plurality of transmission schedules are determined and utilized by the network device for transmission of the packets from the higher layer packet source.

10. A network device configured to schedule packets received from a higher layer packet source for transmission by the network device onto a medium shared with at least one contending network device where access to the medium is controlled by a medium access protocol, the network device comprising:
    a memory;
    a transmitter coupled to the memory; and
    a processor coupled to the memory and to the transmitter and configured to:
        obtain medium history information associated with the medium;
        determine a transmission schedule that provides for periodic opportunities to transmit a packet from the network device, the transmission schedule minimizing contention with transmission from the at least one contending network device by taking into account the medium history information associated with the medium;
        provide, to a medium access controller that operates in accordance with the medium access protocol, at least some of the packets based on the determined transmission schedule; and
        transmit, from the transmitter, packets output from the medium access controller, wherein the transmission schedule comprises a time alignment parameter and a time period parameter, wherein the at least some of the packets are provided to the medium access controller based in part on the time alignment parameter and the time period parameter.

11. The network device of claim 10, wherein the time period parameter is based on a reception time period at which packets are received from the higher layer packet source.

12. The network device of claim 10, wherein the time alignment parameter is based on a transmission duration allowance parameter and on the medium history information.

13. The network device of claim 10, wherein the medium history information includes received signal strength information.

14. The network device of claim 10, wherein the time alignment parameter is based on an extended transmission duration allowance parameter and on the medium history information, wherein the extended transmission duration allowance parameter includes a plurality of time offsets and the time alignment parameter is based on a selection of one of the plurality of time offsets.

15. The network device of claim 10, wherein the processor is further configured to modify the transmission schedule by adjusting the time alignment parameter to reduce a time gap between a transmission from the network device and a transmission from the at least one contending network device.

16. The network device of claim 10, wherein the processor is further configured to:
obtain updated medium history information associated with the medium; and
modify, in the network device, the transmission schedule based at least in part on the updated medium history information associated with the medium.

17. The network device of claim 16, wherein the updated medium history information is obtained upon a determination that contention has occurred on the medium with the one or more of the at least one contending network device.

18. The network device of claim 10, wherein a plurality of transmission schedules are determined and utilized by the network device for transmission of the packets from the higher layer packet source.

19. A non-transitory storage medium which stores computer instructions readable by a processor of a network device to implement functions for scheduling packets received from a higher layer packet source for transmission by the network device onto a medium shared with at least one contending network device where access to the medium is controlled by a medium access protocol the functions comprising
obtaining medium history information associated with the medium;
determining, in the network device, a transmission schedule that provides for periodic opportunities to transmit a packet from the network device, wherein the transmission schedule minimizes contention with transmission from the at least one contending network device by taking into account the medium history information associated with the medium;
providing, to a medium access controller in the network device that operates in accordance with the medium access protocol, at least some of the packets based on the determined transmission schedule; and
transmitting, from the network device, packets output from the medium access controller, wherein the transmission schedule comprises a time alignment parameter and a time period parameter, wherein the at least some of the packets are provided to the medium access controller based in part on the time alignment parameter and the time period parameter.

20. The non-transitory storage medium of claim 19, wherein the time period parameter is based on a reception time period at which packets are received from the higher layer packet source.

21. The non-transitory storage medium of claim 19, wherein the time alignment parameter is based on a transmission duration allowance parameter and on the medium history information.

* * * * *